(12) United States Patent
Reponen et al.

(10) Patent No.: US 8,373,799 B2
(45) Date of Patent: Feb. 12, 2013

(54) VISUAL EFFECTS FOR VIDEO CALLS

(75) Inventors: Erika Reponen, Tampere (FI); Jarmo Kauko, Tampere (FI)

(73) Assignee: Nokia Corporation, Espoo (FI)

( * ) Notice: Subject to any disclaimer, the term of this patent is extended or adjusted under 35 U.S.C. 154(b) by 1353 days.

(21) Appl. No.: 11/617,940

(22) Filed: Dec. 29, 2006

(65) Prior Publication Data

US 2008/0158334 A1    Jul. 3, 2008

(51) Int. Cl.
*H04N 7/08* (2006.01)
*H04N 7/14* (2006.01)

(52) U.S. Cl. ........ 348/473; 348/461; 348/460; 348/578; 348/468; 348/14.08

(58) Field of Classification Search ................. 348/473, 348/14.01, 14.02, 14.08, 474, 465, 468, 461, 348/460, 578; 725/147, 153
See application file for complete search history.

(56) References Cited

U.S. PATENT DOCUMENTS

| 7,266,289 | B2 * | 9/2007 | Kimura et al. ............... 386/244 |
| 2008/0111822 | A1 * | 5/2008 | Horowitz et al. ............ 345/530 |

* cited by examiner

*Primary Examiner* — Jefferey Harold
*Assistant Examiner* — Jean W Desir
(74) *Attorney, Agent, or Firm* — Alston & Bird LLP

(57) ABSTRACT

An apparatus including a display, an input unit and a processor connected to the display and input unit, the processor being configured to recognize an input and embed at least one effect, in response to the input, into a video feed transmitted from the apparatus.

24 Claims, 18 Drawing Sheets

VISUAL EFFECTS FOR VIDEO CALLS

BACKGROUND

1. Field

The disclosed embodiments relate to user interfaces and, more particularly, to user interfaces for communicating with other devices.

2. Brief Description of Related Developments

When people speak with each other non-verbal communication such as body movement, hand and face gestures play a large part in the conversation. Hand and face gestures may indicate to others an emotional state of the speaker. For example, when the speaker has a frown on his/her face it generally means that the speaker is sad or upset. When the speaker is smiling it generally means the speaker is in a happy mood. Likewise, when the speaker is frantically waving his/her arms when speaking there may be an indication that the user is excited in some way.

As the individual lifestyles becomes increasingly busy there is less time to sit with friends and family to have a face to face conversation. In addition, people living far away from each other may not be able to have face to face conversations with others. As such, more and more people are using communication devices to hold conversations, as opposed to a face to face talk, to communicate with co-workers, friends, family and the like. However, non-verbal communication such as body movement, hand and facial gestures may be lacking from the conversation. These non-verbal communications are an important part of a conversation as they may indicate to a listener the emotional state of the speaker, they may emphasize what the speaker is saying and the like.

Video calls may be used to enable individuals who are unable to have a conventional face to face conversation (e.g. a conversation where the individuals are physically located next to each other) to converse while looking at each other. However, in video calls usually only the face of the participants are shown on the display of the receiving device. Any facial expressions that do appear on the display of the receiving device may be misinterpreted or hard to see because of, for example, poor display resolution or a small display size, represented on the display at the wrong time due to network lag, and the like. Also due to the limited display size the body movements such as hand gestures may not be visible to the participants of the video call.

It would be advantageous to supplement the video feed in a video call with visualizations that coincide with the content of the call in a manner that is clear to a participant of the call.

SUMMARY

In one embodiment, an apparatus is provided. The apparatus includes a display, an input unit and a processor connected to the display and input unit, the processor being configured to recognize an input and embed at least one effect, in response to the input, into a video feed transmitted from the apparatus.

In another embodiment, a method is provided. The method includes recognizing an event with a first device during a video call or cast, embedding at least one effect, in response to the event, into a video feed transmitted from the first device and receiving the video feed in at least a second device so that the at least one effect is presented to a user of the at least second device in the received video feed.

In one embodiment, a computer program product is provided. The computer program product includes a computer useable medium having computer readable code means embodied therein for causing a computer embed at least one effect into a video feed. The computer readable code means in the computer program product includes computer readable program code means for causing a computer to recognize an event during a video call or cast, computer readable program code means for causing a computer to embed at least one effect, in response to the event, into a video feed transmitted from the computer and computer readable program code means for causing at least a second computer to receive the video feed so that the at least one effect is presented to a user of the at least second computer in the received video feed.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENT(s)

Figure 1:
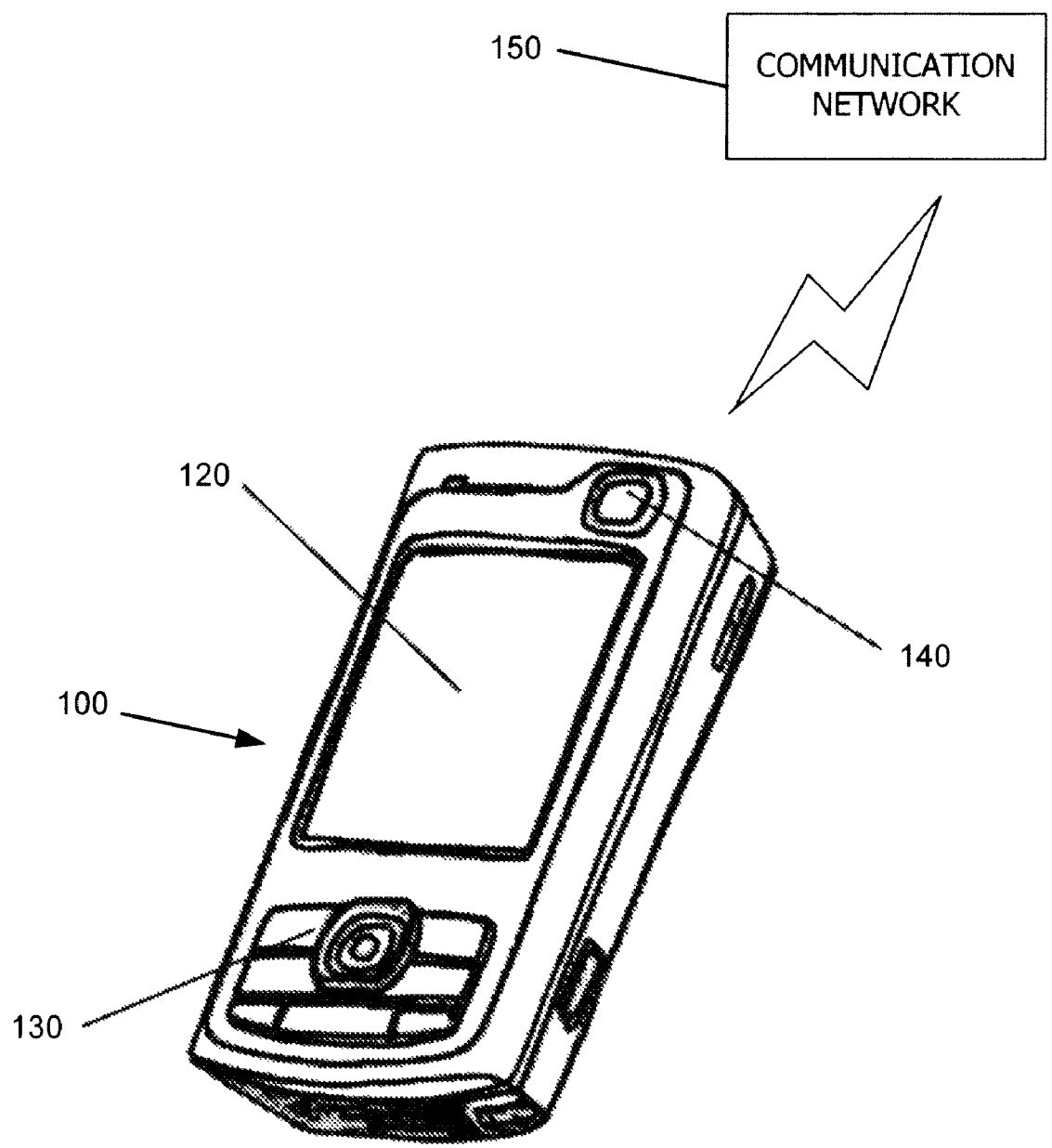
FIG. 1 illustrates a device in which aspects of the disclosed embodiments may be employed.

FIG. 1 shows a communication device 100 in which aspects of the disclosed embodiments may be implemented. Although the embodiments disclosed will be described with reference to the embodiments shown in the drawings, it should be understood that the embodiments disclosed can be embodied in many alternate forms of embodiments. In addition, any suitable size, shape or type of elements or materials could be used.

The communication device 100 may be any suitable communication device such as, for example a personal communicator, a tablet computer, a laptop or desktop computer, a television or television set top box or any other suitable device. In this example, the device 100 includes a keypad 130, a display 120, and a camera 140. The camera 140 in FIG. 1 is shown as being part of the device 100 but it should be understood that the camera may be a peripheral device connected to the device 100 via any suitable wired or wireless connection. The device may enable a user to communicate with other devices such as, for example, mobile communication devices, laptop computers, desktop computers and the like over any suitable communication network, such as network 150. The network may be a cellular network, wide area network, local area network, the internet, mobile television network and the like.

Figure 2:
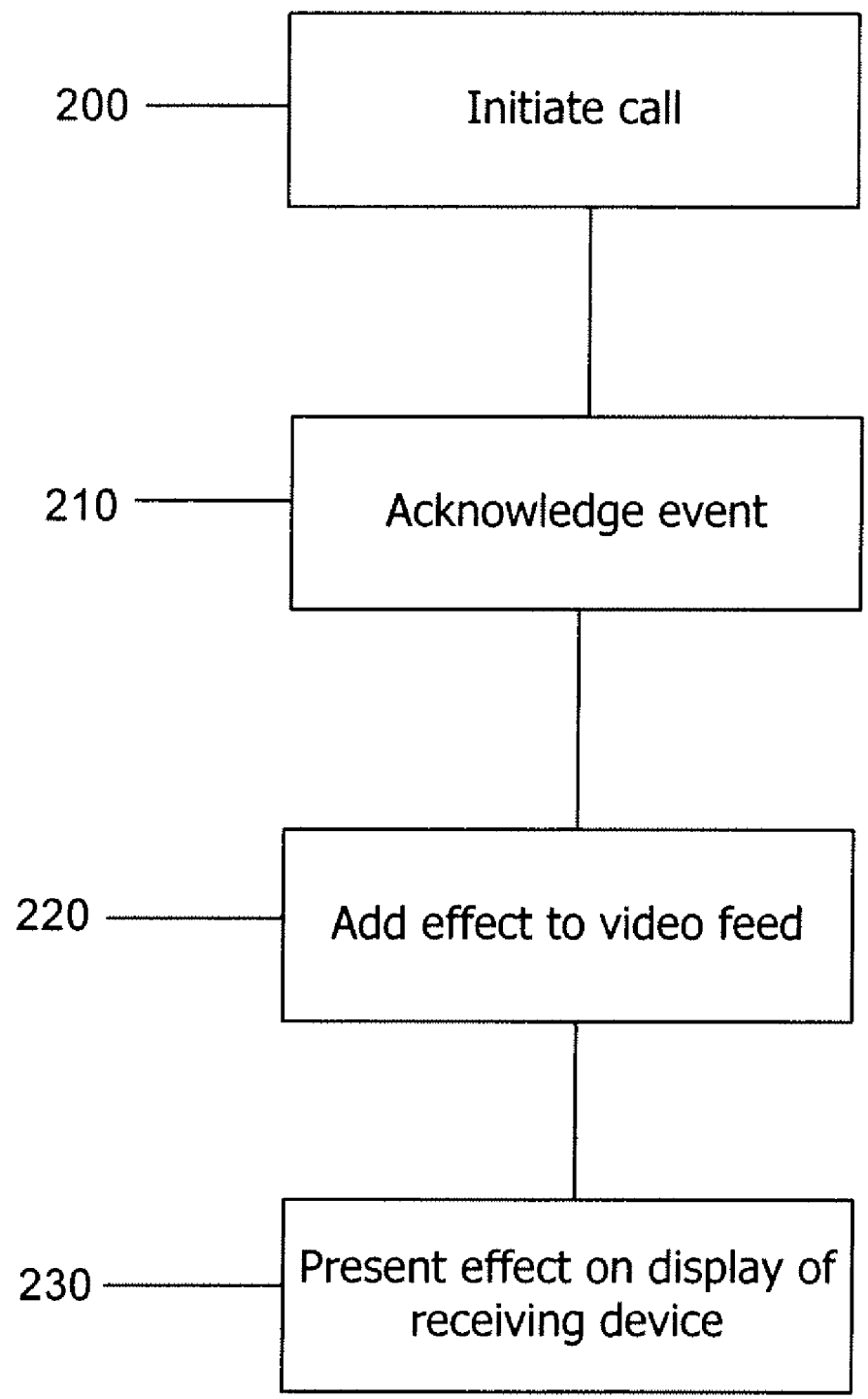
FIG. 2 is a flow diagram in accordance with an embodiment.

In accordance with the disclosed embodiments the device 100 may allow a user to initiate a video call, video conference or video cast to one or more other devices over the network 150 (FIG. 2, Block 200). The device 100 may be configured recognize or acknowledge an event that indicates that a visual effect is to be added or embedded in the video feed of the call (FIG. 2, Block 210) so that the effects are part of the video. Upon acknowledging the event the effect, such as a visual effect, may be added to the video feed (FIG. 2, Block 220). The effect may be transferred to the receiving device where it is presented on the display of the receiving device over the video feed (FIG. 2, Block 230).

The effects that are added to the video feed and presented to the recipients of the video may correspond to an aspect of the video call, such as for example, the content of a call at any given time, the participant's attitude or state of mind at any time during the call and the like. The disclosed embodiments may supplement the video and audio feed of the call to accurately convey what the speaker is saying, for example, as it would be conveyed if the participants were having a face to face conversation. The disclosed embodiments may provide a substitute for non-verbal communications that are present but may not otherwise be visible during the video call. The presentation of the effects may also help one to understand the meaning of the conversation if the video and/or audio quality of the call are poor.

The disclosed embodiments may allow a user of the device to have some form of entertainment during by causing, for example, comical effects to be displayed on the recipients devices. The disclosed embodiment may also allow users to personalize video calls/casts.

Figure 3:
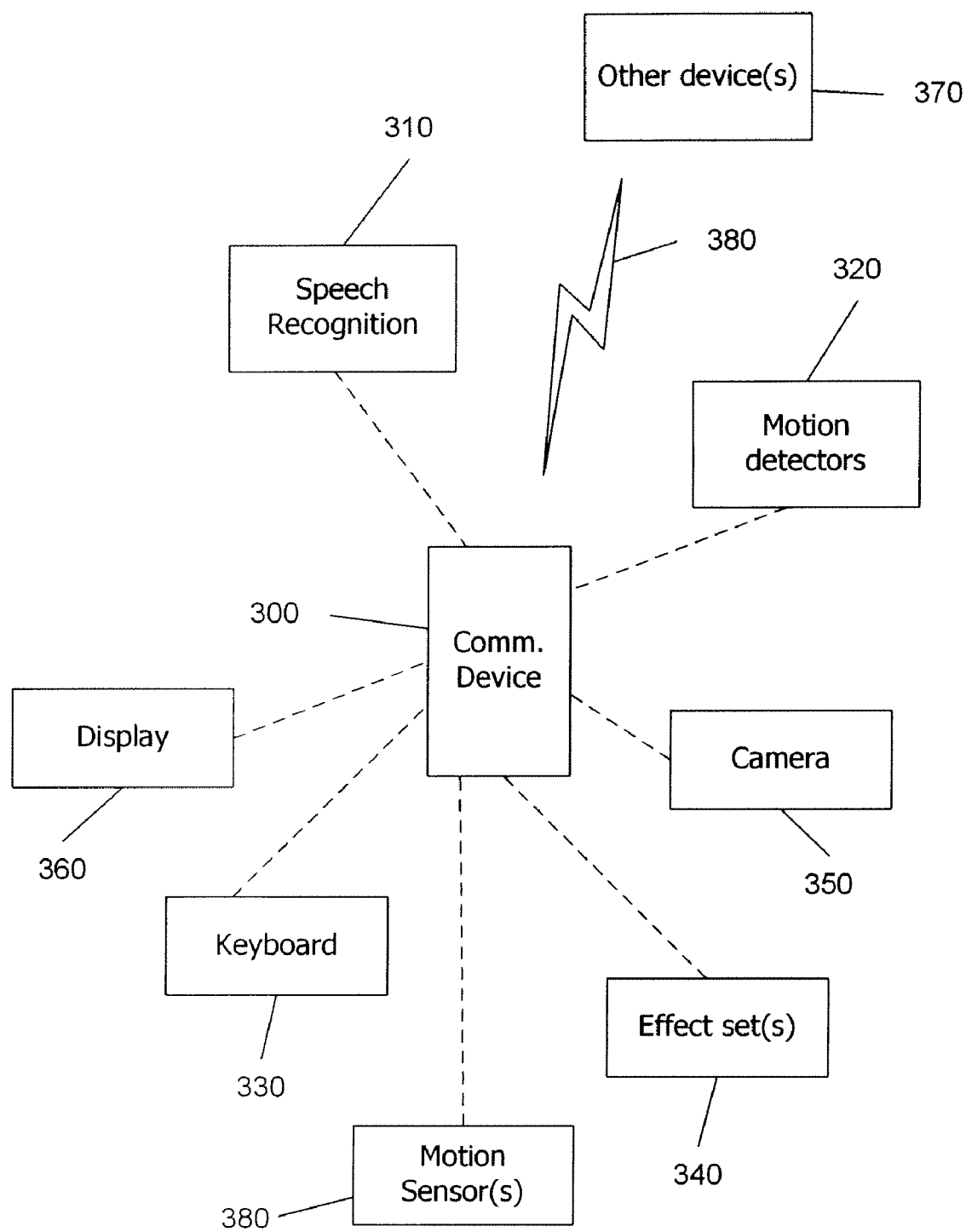
FIG. 3 is a schematic illustrate of a device incorporating features of an embodiment.

Referring now to FIG. 3, a schematic illustration of a communications device 300 is shown. The communication device 300 may be substantially similar to that described above with respect to FIG. 1. The device 300 may include any suitable features such as, for example, a display 360, a keyboard 330, a camera 350. The device 300 may also include other features such as any suitable motion detectors 320, any suitable speech recognition units 310 and visual effect sets 340. The display may be a touch enabled display. The keyboard may be any suitable keyboard including, but not limited to, a T9 or qwerty keyboard. The visual effects sets 340 may include any suitable visual effects that are added to the video feed during a video call/cast. The effect sets 340 may be individual effects or sets of effects that have, for example, a common theme (e.g. outdoors, celebrity, animal, faces and the like). The effect sets 340 may be user defined, obtained from other devices or downloaded from, for example the internet or some other source external to the device 300. The effect sets 340 may include, but are not limited to, any combination of photographs, text, graphics, images, animations, cartoons, logos, videos, sounds and the like. The device 300 may include any suitable number of effect sets 340.

The user of device 300 may initiate a video call/cast to the user of device 370. The user of device 300 may for any suitable reason want to add effects to the video broadcast from the device 300. Reasons for adding effects to the video feed include, but are not limited to, entertainment, emphasis during the conversation, to convey an emotion, an advertisement, describe an event discussed during the call/cast and the like.

Figure 4:
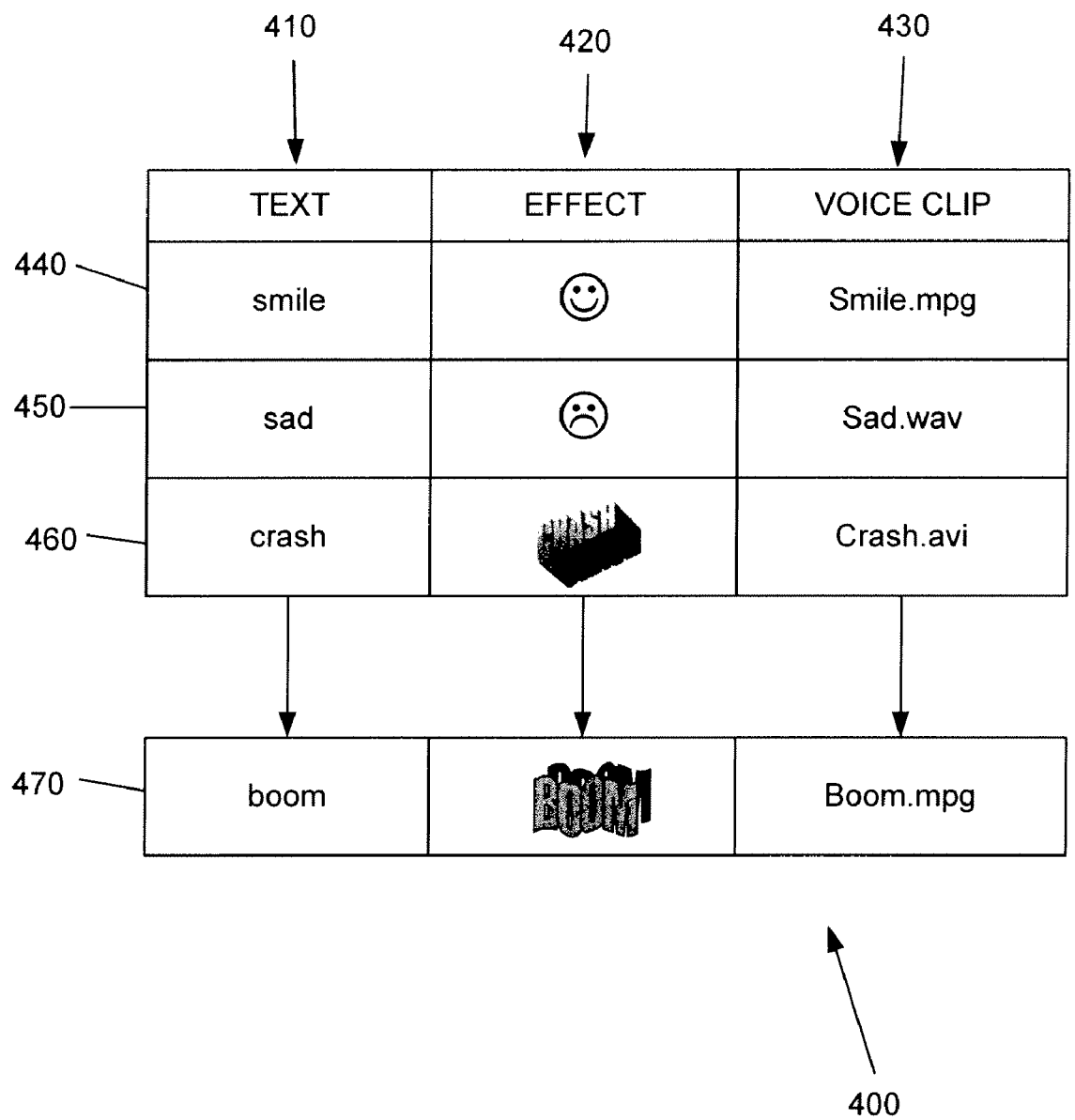
FIG. 4 is a table illustrating aspects of an embodiment.

In one embodiment the device 300 may be configured to recognize certain words or phrases via the speech recognition unit 310. In this example, there may be a suitable settings menu in the device 310 for a user to associate a word or phrase with one or more effects. The device 300 may be configured to store any suitable information pertaining to the effects in any suitable manner. This information may be associated or mapped to other respective information in any suitable manner. For exemplary purposes only, a table is shown in FIG. 4 illustrating a memory table 400 of the device 300. The table may include any suitable information including, but not limited to, effect sets 420, text associated with the effect set 410 and a voice clip 430 associated with a respective effect. In this example a user defined effect set 420 is shown in table 400. The set may include any suitable number of effects. In this example, the device 300 may be configured so that the word "smile" and voice clip "Smile.mpg" is associated with a smile emoticon 440. The voice clip may have any suitable file format and may be the user's voice or any other suitable voice pronouncing the word "smile". In alternate embodiments the voice clip may include the pronunciation of any other word so that the smile appears when the other word is spoken. Similarly, the word "sad" and voice clip "Sad.wav" is associated with the sad emoticon 450, the word "crash" and voice clip "Crash.avi" is associated with crash wordart 460 and the word "boom" and the sound clip "Boom.mpg" is associated with boom wordart 470.

Figure 5:
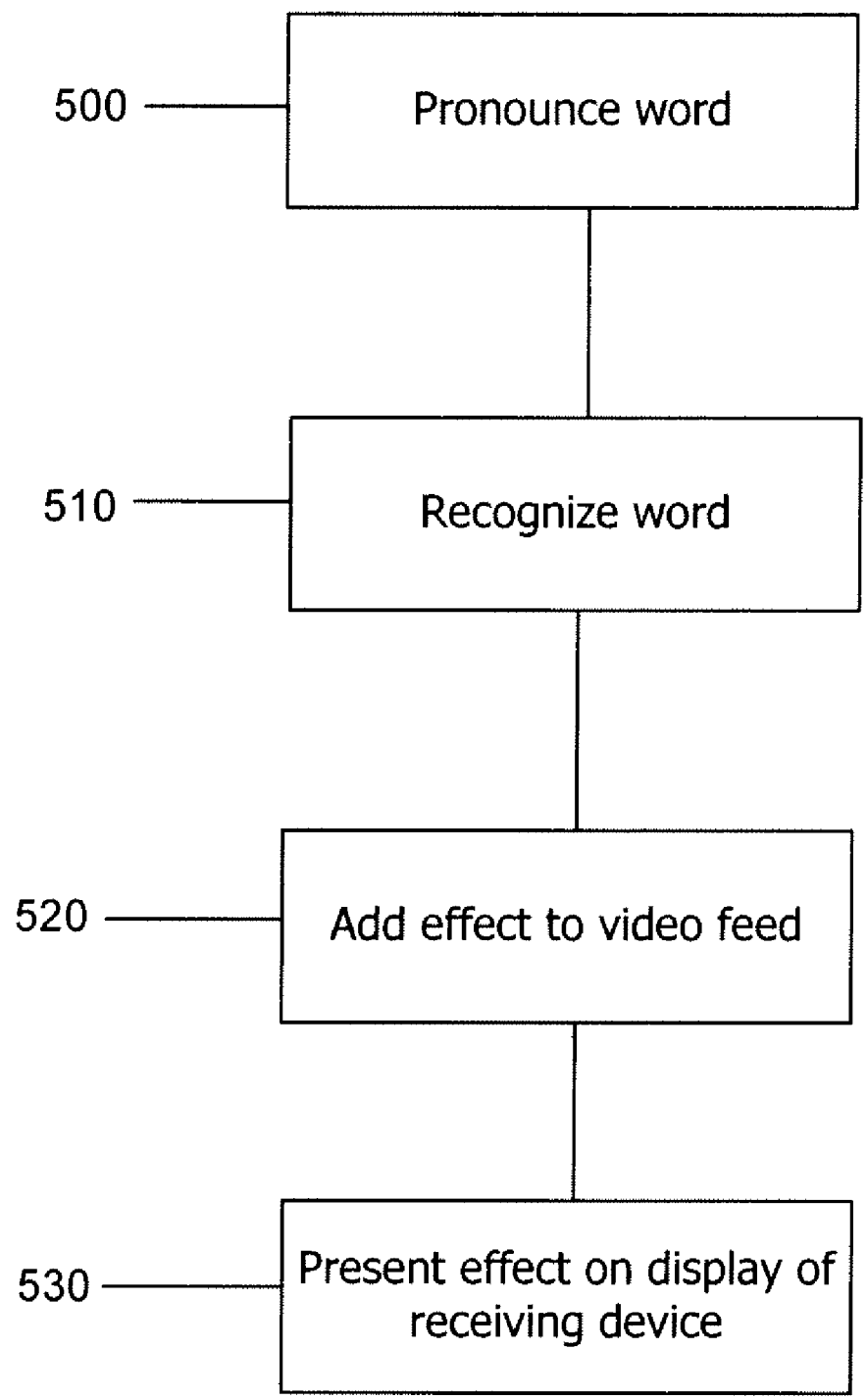
FIG. 5 is a flow diagram in accordance with an embodiment.

During the video call/cast the user of device 300 may say the word "smile" (FIG. 5, Block 500). The speech recognition unit 310 may recognize the word "smile" and cause the device 300 to insert the smile emoticon 440 into the video feed broadcast from the device 300 (FIG. 5, Blocks 510 and 520). Although the effects are described in this example as being added into the video feed of the sending device it is noted that in the embodiments disclosed herein the effects may imposed over an incoming video feed in a receiving device. The smile emoticon 440 may be received in the other device(s) 370 along with the video feed and displayed on a display of the other device (FIG. 5, Block 530). The effect, such as the smile emoticon 440 may be presented on the display of the device for any suitable period of time. For example, the display period for the effect may be settable by the sender of the effect or the recipient of the effect. In other embodiments the display period may be some predefined period of time set during the manufacture of the device. The addition of the effect may be automatic upon the recognition of a certain word or it may be input into the video feed manually. In other embodiments, the user may receive a prompt asking the user if the effect should be added to the video feed. In alternate embodiments, sounds may be inserted into the video feed. For example, then the word "crash" appears on the receiving device a crash sound may also be played. In other alternate embodiments the sound may be played without any visual effect.

Figure 7:
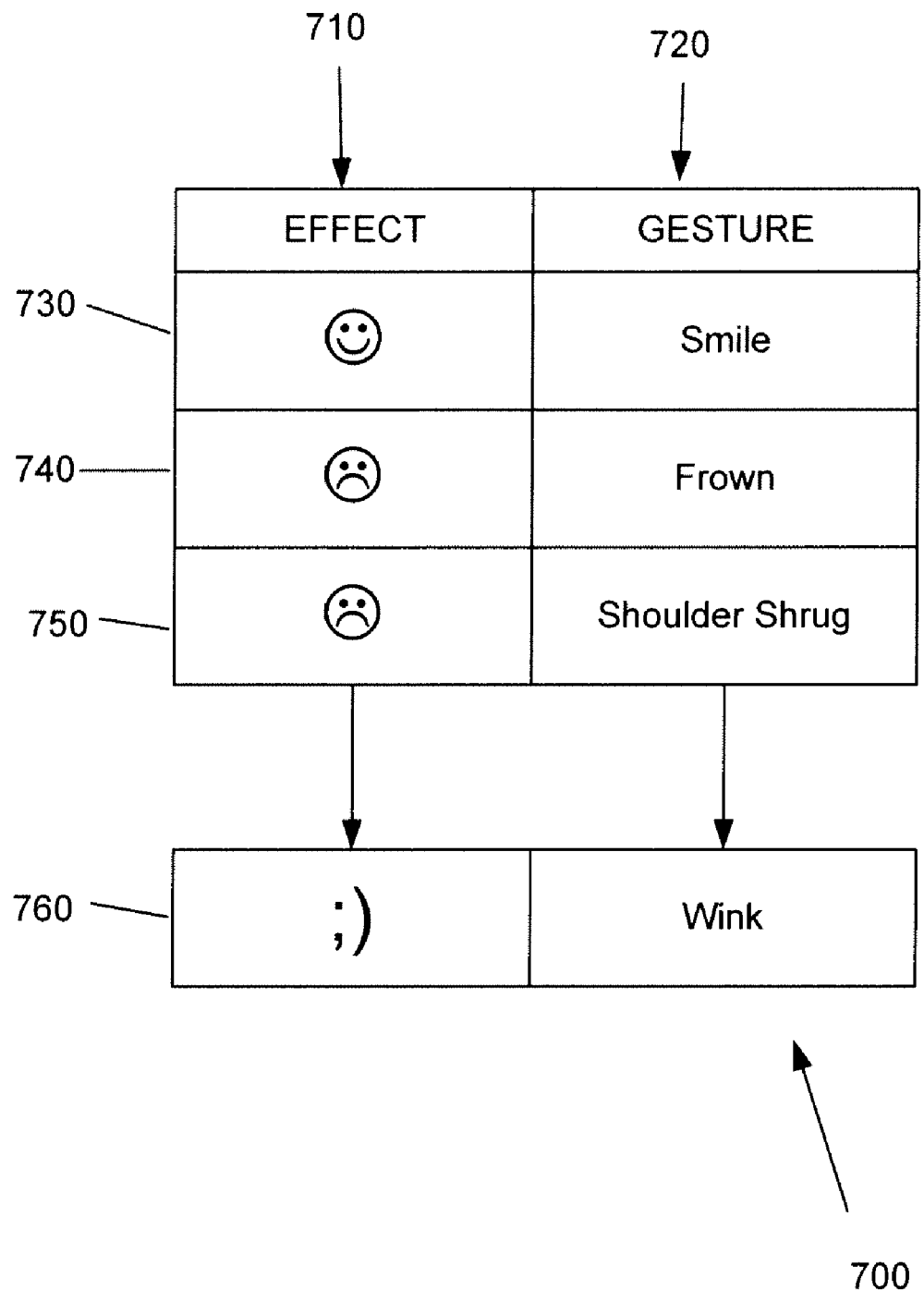
FIG. 7 is a table illustrating aspects of an embodiment.

In another embodiment the device 300 may be configured to recognize non-verbal gestures (e.g. facial expressions, body movements and the like) of the user via the motion detectors 320. In this example, the device may include any suitable software or hardware that would enable the device 300 to recognize the non-verbal gestures. For exemplary purposes only, a table is shown in FIG. 7 illustrating a memory table 700 of the device 300. The table may include, but is not limited to, an effect set 710 and an associated gesture 720. In this example, the device 300 may be configured so that the non-verbal gesture of a smile is associated with a smile emoticon 730. Similarly, the non-verbal gesture of a frown is associated with the sad emoticon 740, the non-verbal gesture of a shoulder shrug is associated with the sad emoticon 750 and the non-verbal gesture of a winking is associated with a wink emoticon 760.

Figure 6:
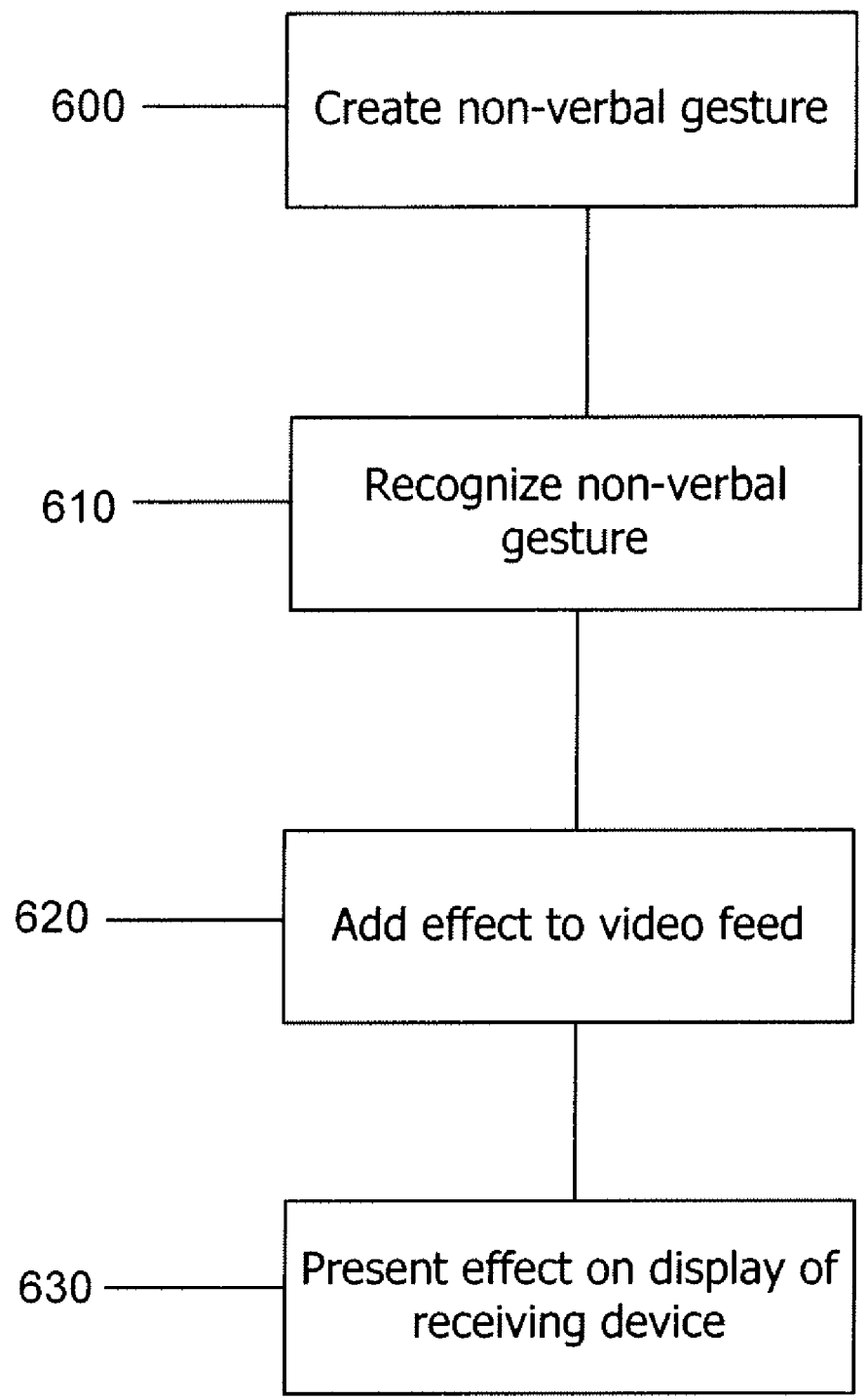
FIG. 6 is a flow diagram in accordance with an embodiment.

During the video call/cast the user of device 300 may, for example, frown (FIG. 6, Block 600). The motion detectors 320 may recognize the frown and cause the device 300 to insert the frown emoticon 740 into the video feed broadcast from the device 300 (FIG. 6, Blocks 610 and 620). The frown emoticon 740 may be received in the other device(s) 370 along with the video feed and displayed on a display of the other device (FIG. 6, Block 630). The effect, such as the frown emoticon 740 may be presented on the display of the device for any suitable period of time. For example, the display period for the effect may be settable by the sender of the effect or the recipient of the effect. In other embodiments the display period may be some predefined period of time set during the manufacture of the device. The addition of the effect may be automatic upon the recognition of a certain word or it may be input into the video feed manually. In other embodiments, the user may receive a prompt asking the user if the effect should be added to the video feed. In other embodiments the device 300 may have motion sensors 380 for detecting the movement of the device so that the effects added to the video feed correspond to the motion of the phone. For example, is a user of device 300 shakes the device a crash effect may appear in the video feed. In another example, if the user of device 300 makes shapes by moving the device 300 the corresponding shapes may appear in the video feed. In alternate embodiments any suitable effects can be created and inserted into the video feed by moving the device 300 around.

Figure 8:
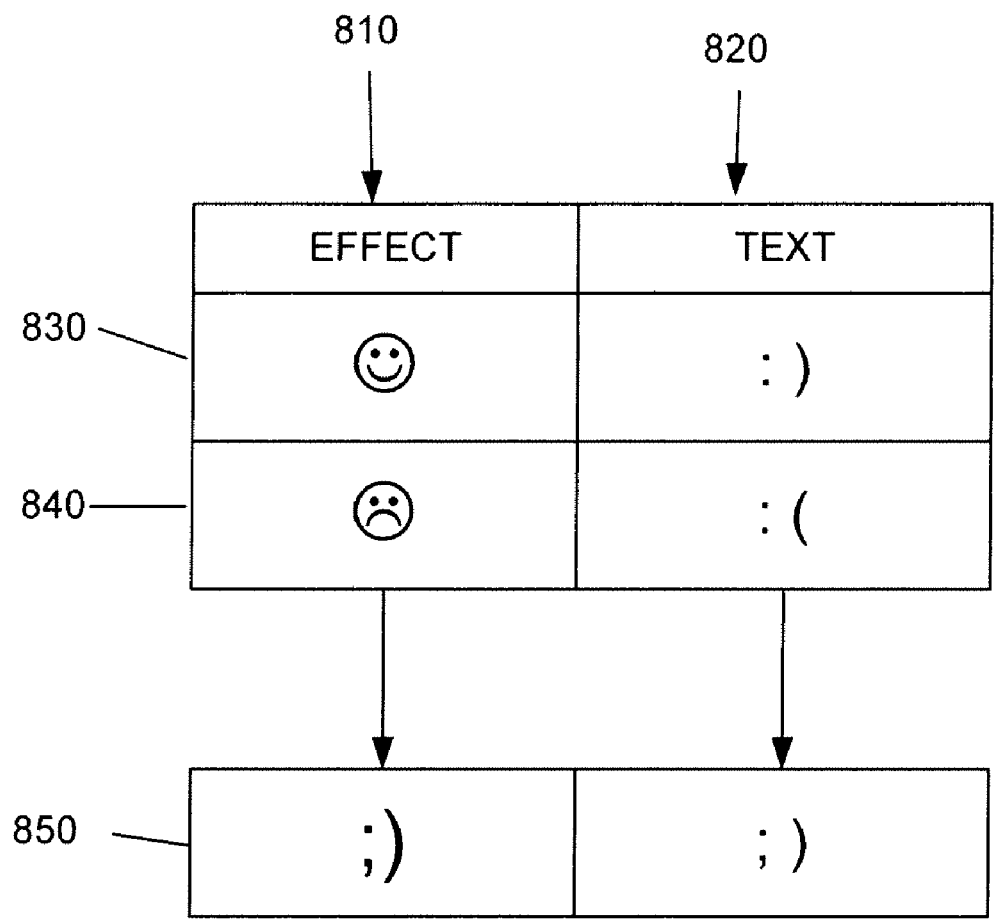
FIG. 8 is a table illustrating aspects of an embodiment.

In one embodiment the effects may be added to the video feed by typing via the keyboard 330. In alternate embodiments the text or any other suitable image or effect may be input using a pointer on a touch enabled screen of the device 300. For exemplary purposes only, a table is shown in FIG. 8 illustrating a memory table 800 of the device 300. The table 800 may include, but is not limited to, an effect set 810 and an associated text representation of the gesture 820. In this example, the device 300 may be configured so that the text ":)" is associated with a smile emoticon 830. Similarly, the text ":(" may be associated with the sad emoticon 840 and the text ";)" may be associated with the wink effect 850. In alternate embodiments, the effects may appear on the display of a recipient's device exactly as it appears when entered by the user. For example, if the user enters the text ":)" the text ":)" will appear on the recipients display rather than the emoticon smile emoticon. In other embodiments the user may enter symbols or any other suitable characters to be added to the video feed.

Figure 9:
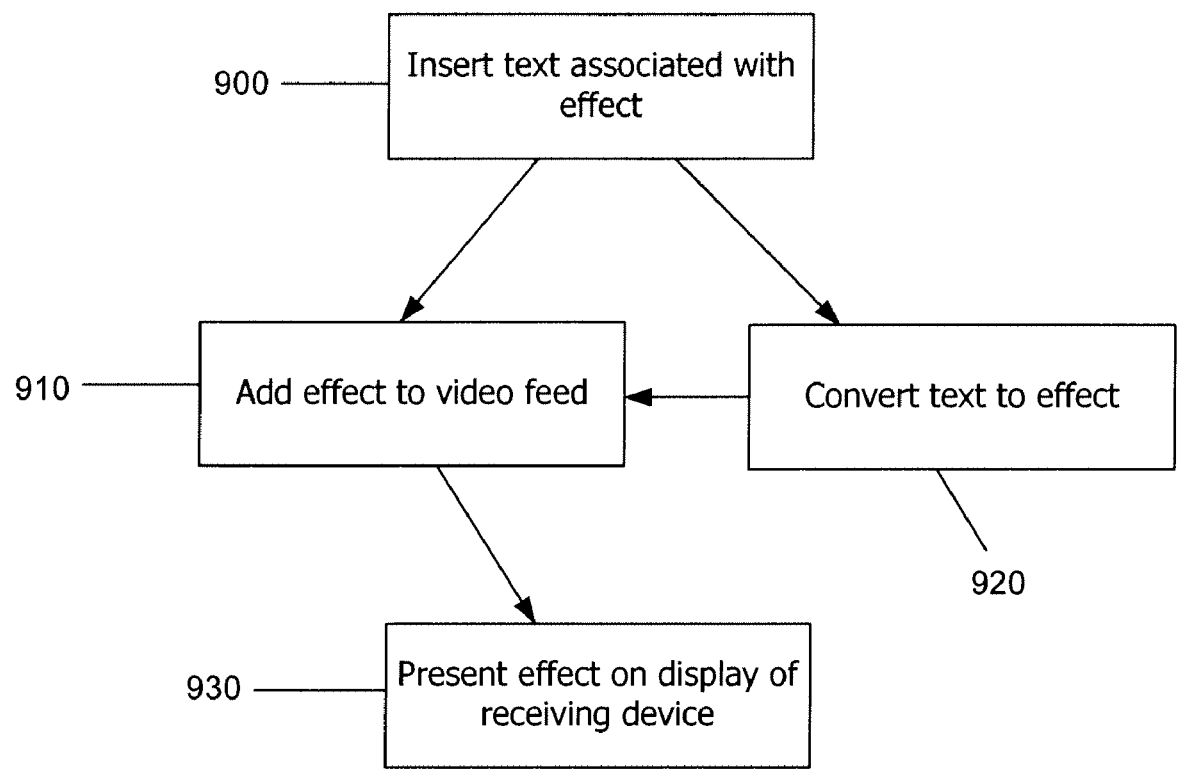
FIG. 9 is a flow diagram in accordance with an embodiment.

During the video call/cast the user of device 300 may, for example, enter the text ";)" (FIG. 9, Block 900). The device 300 may look at the table to determine the associated effect or it may add the text ":)" or any other image (e.g. drawings, photos, etc.) as it was inserted by the user into the video feed (FIG. 6, Blocks 910 and 920). The text or corresponding effect 830 may be received in the other device(s) 370 along with the video feed and displayed on a display of the other device (FIG. 6, Block 630). The text or corresponding effect may be presented on the display of the device for any suitable period of time. For example, the display period for the effect may be settable by the sender of the effect or the recipient of the effect. In other embodiments the display period may be some predefined period of time set during the manufacture of the device. The addition of the effect may be automatic upon the recognition of a certain word or it may be input into the video feed manually. In other embodiments, the user may receive a prompt asking the user if the effect should be added to the video feed.

Figure 10:
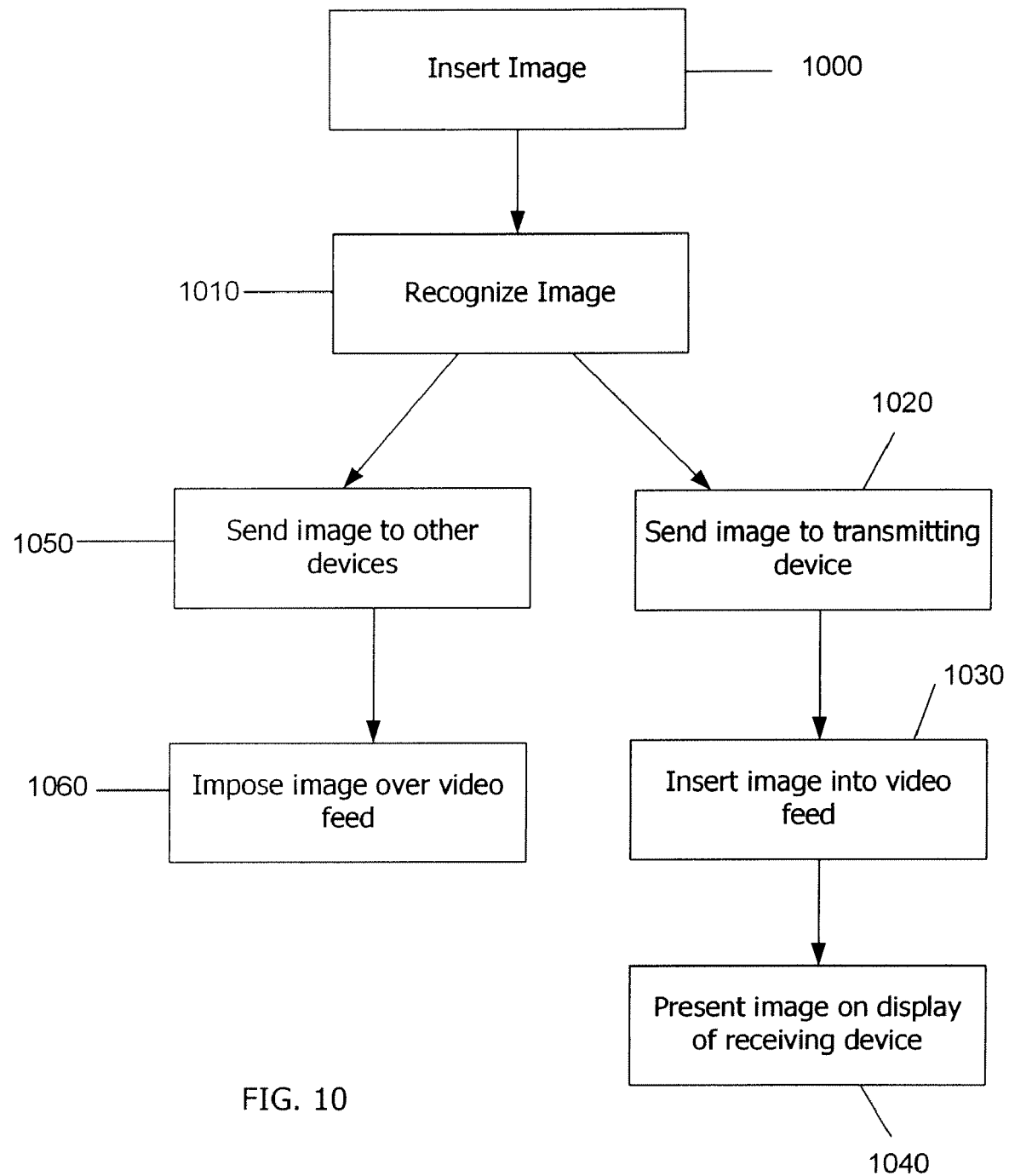
FIG. 10 is a flow diagram in accordance with an embodiment.

In another embodiment the user of device 300 may want to "draw" on the video image received in his device, such as during a conference call where more than one participant is displayed on the display of the device 300. For example, when one of the participants is being mean during the call (e.g. the user of device 370), the user of device 300 may draw horns on the head of the mean participant (FIG. 10, Block 1000). The device 300 may recognize the input and send a signal back to device 370 to be inserted into the video feed broadcast from device 370 (FIG. 10, Blocks 1010-1030). The image may be presented on the display of the other devices (FIG. 10, Block 1040). In other embodiments the device 300 may send a signal to the devices of the other participants that may identify the feed to which the drawing is to be imposed (i.e. the video feed from device 370) so that the other devices may impose the drawing over the feed from device 370 (FIG. 10, Blocks 1050 and 1060). The image drawn over the image of the user of device 370 may follow the image as it is presented on the displays of the devices. For example as the user of device 370 moves his/her head around the horns will follow the head of the user of device 370 as it moves around on the display of the other devices.

In other embodiments, there may be a virtual pet, face or avatar that is added to the video feed of the call/cast. The virtual pet or face may be any suitable image such as for example, the head or whole body of a dog, cat or person, a car and the like. As the user enters effects into the device 300, a characteristic of the virtual pet or face changes according to the effect entered. For example, a virtual dog, such as the dog 1220 in FIG. 12B, is added to the video feed so that when a user of device 300 enters a happy effect the dog smiles and wags its tail. If the user enters an excited effect the dog may jump around and the like.

Figure 11:
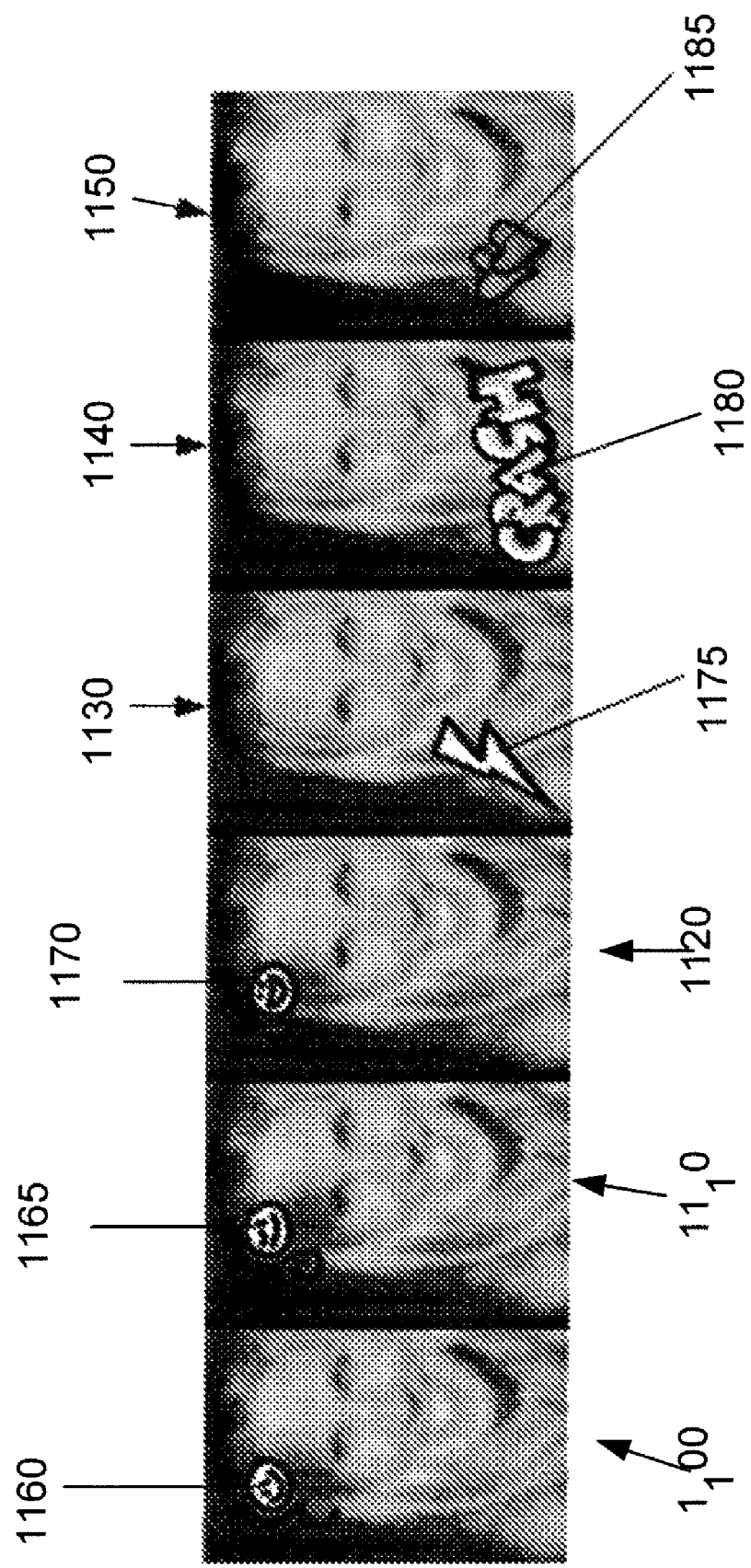
FIGS. 11-13 are screen shots illustrating aspects of the disclosed embodiments.
Figure 12A:
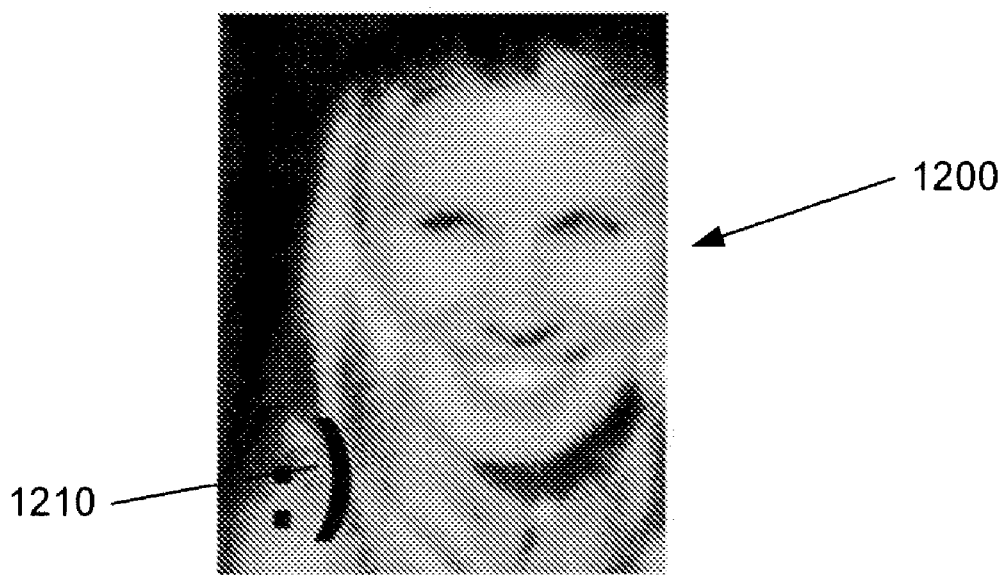
Figure 12B:
Figure 13:
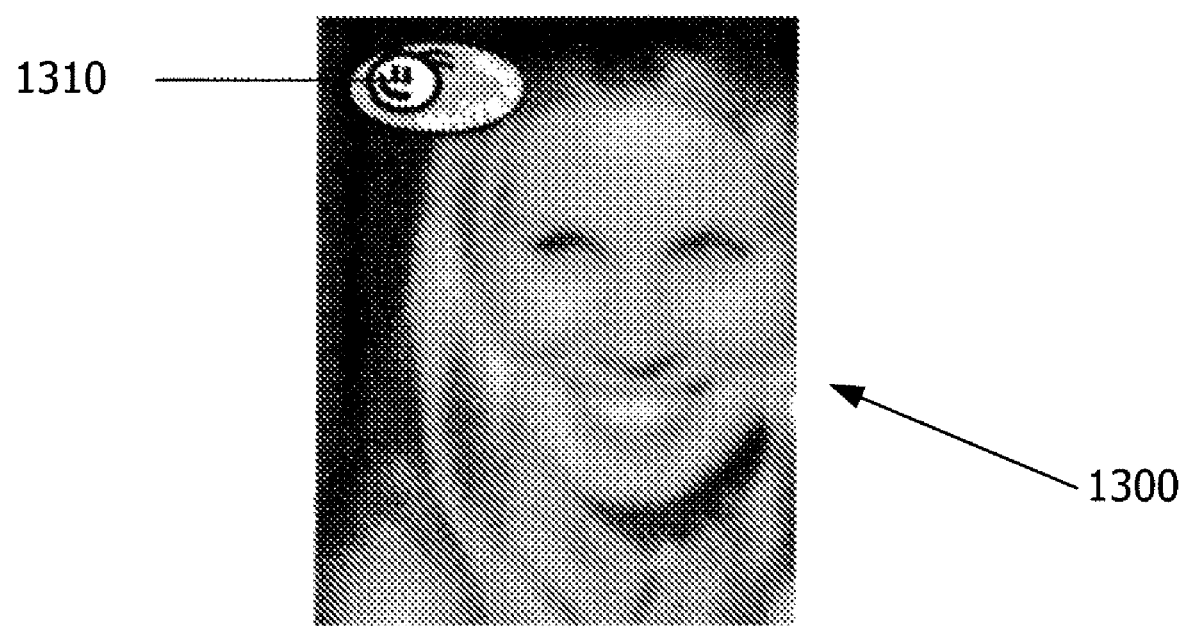

Referring now to FIGS. 11-13 exemplary screen shots are illustrated showing placement of the effects in the video feed. In the exemplary screen shots the effects may be added to the video feed in accordance with any of the disclosed embodiments described above. As can be seen in FIG. 11, a smiling face 1160, a winking face 1165 and a laughing face 1170 are respectively added to the upper left of the screen shots 1100-1120. A lightning bolt 1175, text 1180 and hearts 1185 are added to the bottom left of the screen shots 1130-1150. There may be any suitable settings menu in the device 300 for setting where the effects appear. For example the user may set the effects to appear in the upper left or right, lower left or right, center, along an edge of the image or the user may set the effects to appear in a random manner (e.g. anywhere on the display). In other embodiments, the location of the effects may be configured so that the effect follows a certain attribute of the video. For example, big red cartoon lips may be added to the video feed over the lips of a participant of a video call. The cartoon lips may follow the lips of the participant as the participant moves around in the video. In other embodiments the device may be configured to recognize faces so that the effects are not placed over a participant's face or conversely device may be configured to place the effects over a participant's face. For example, in FIG. 12A the device 300 may recognize the face of the participant shown in the Figure and place the effect 1210 in a portion of the video feed that does not cover the participant's face.

Adding the effects tot he video feed may be context sensitive. For example, if the conversation is about how hot is it outside the effects added to the video may correspond to an effect set that pertains to heat (e.g. fire, the sun, etc.). If the conversation is about fashion the effects added to the video may be from an effect set pertaining to designer clothes and so on. In other embodiments, the effects added to the video feed may be randomly selected from one or more effect sets. For example, as can be seen in FIG. 12B, when the word "hot" is spoken the picture of the dog 1220 or any other random effect may be added to the video feed. In one embodiment intentional misunderstanding can be made with the effects where the effect has nothing to do with or is the opposite of (i.e. a misrepresentation of) the event triggering the addition of the effect into the video feed. For example, the user of device 300 may speak the word "hot" triggering the addition of a snowflake into the video feed. In another example, the user of device 300 may speak the word "car" triggering the addition of a cat into the video feed.

In other embodiments, adding effects to the video feed may be used for advertising purposes. Companies may, for example contract with service providers so that as their company name is said an indication of the company's product is shown. For example, if a participant of the video call/cast mentions the word "computer" a logo 1310 for a computer company may appear. In another example, if a participant mentions a certain brand of car the logo or some other advertising for that car company may be added to the video feed.

Figure 14:
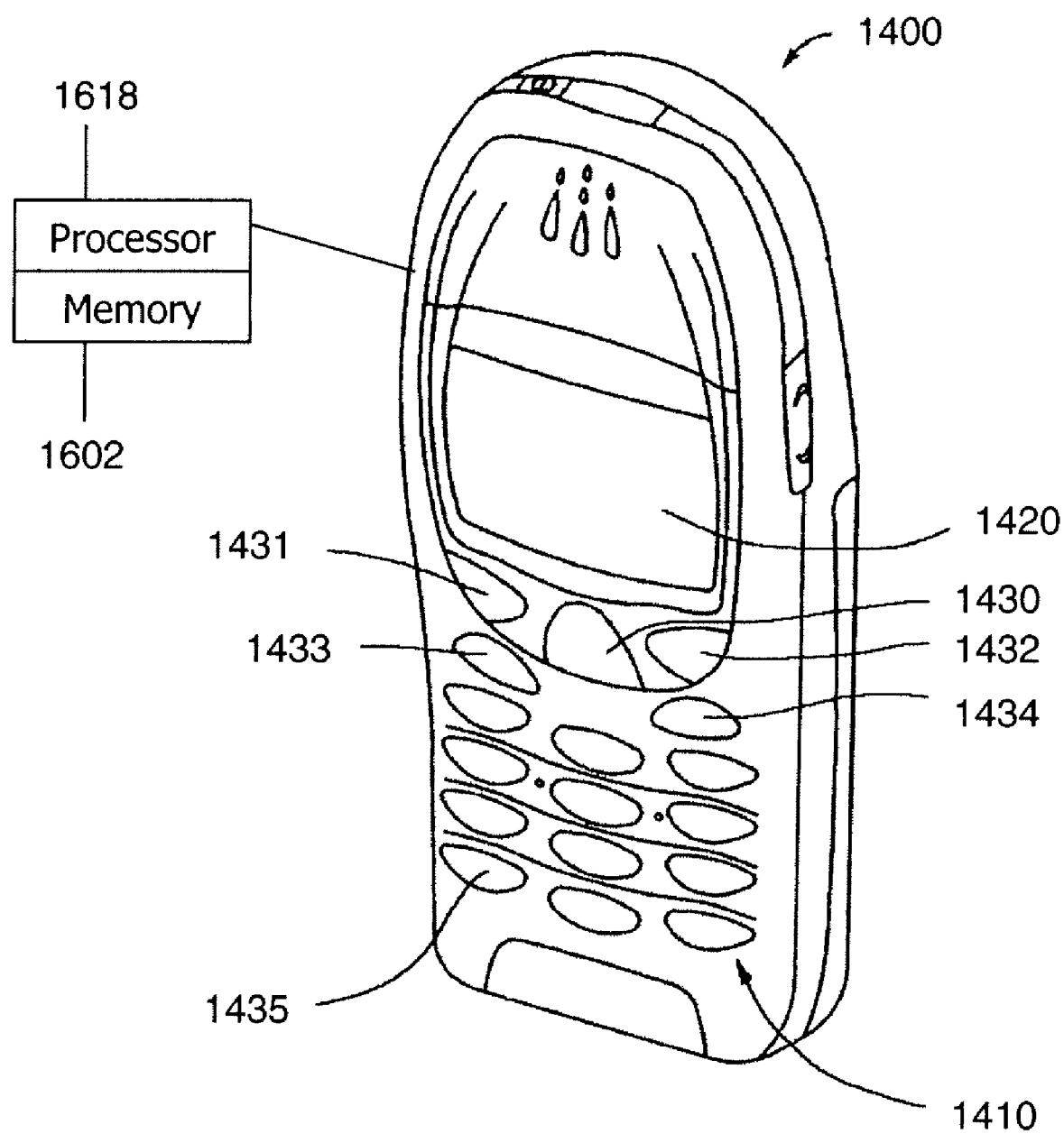
FIG. 14 shows a device incorporating features of an embodiment.

One embodiment of a device 300 in which the disclosed embodiments may be employed is illustrated in FIG. 14. The device may be any suitable device such as terminal or mobile communications device 1400. The terminal 1400 may have a keypad 1410 and a display 1420. The keypad 1410 may include any suitable user input devices such as, for example, a multi-function/scroll key 1430, soft keys 1431, 1432, a call key 1433 and end call key 1434 and alphanumeric keys 1435. The display 1420 may be any suitable display, such as for example, a touch screen display or graphical user interface. The display may be integral to the device 1400 or the display may be a peripheral display connected to the device 1400. A pointing device, such as for example, a stylus, pen or simply the user's finger may be used with the display 1420. In alternate embodiments any suitable pointing device may be used. In other alternate embodiments, the display may be a conventional display. The device 1400 may also include other suitable features such as, for example, a camera, loud speaker, motion detectors, speech recognition devices, connectivity ports or tactile feedback features. The mobile communications device may have a processor 1618 connected to the display for processing user inputs and displaying information on the display 1420. A memory 1602 may be connected to the processor 1618 for storing any suitable information and/or applications associated with the mobile communications device 1400 such as phone book entries, calendar entries, web browser, etc.

Figure 15:
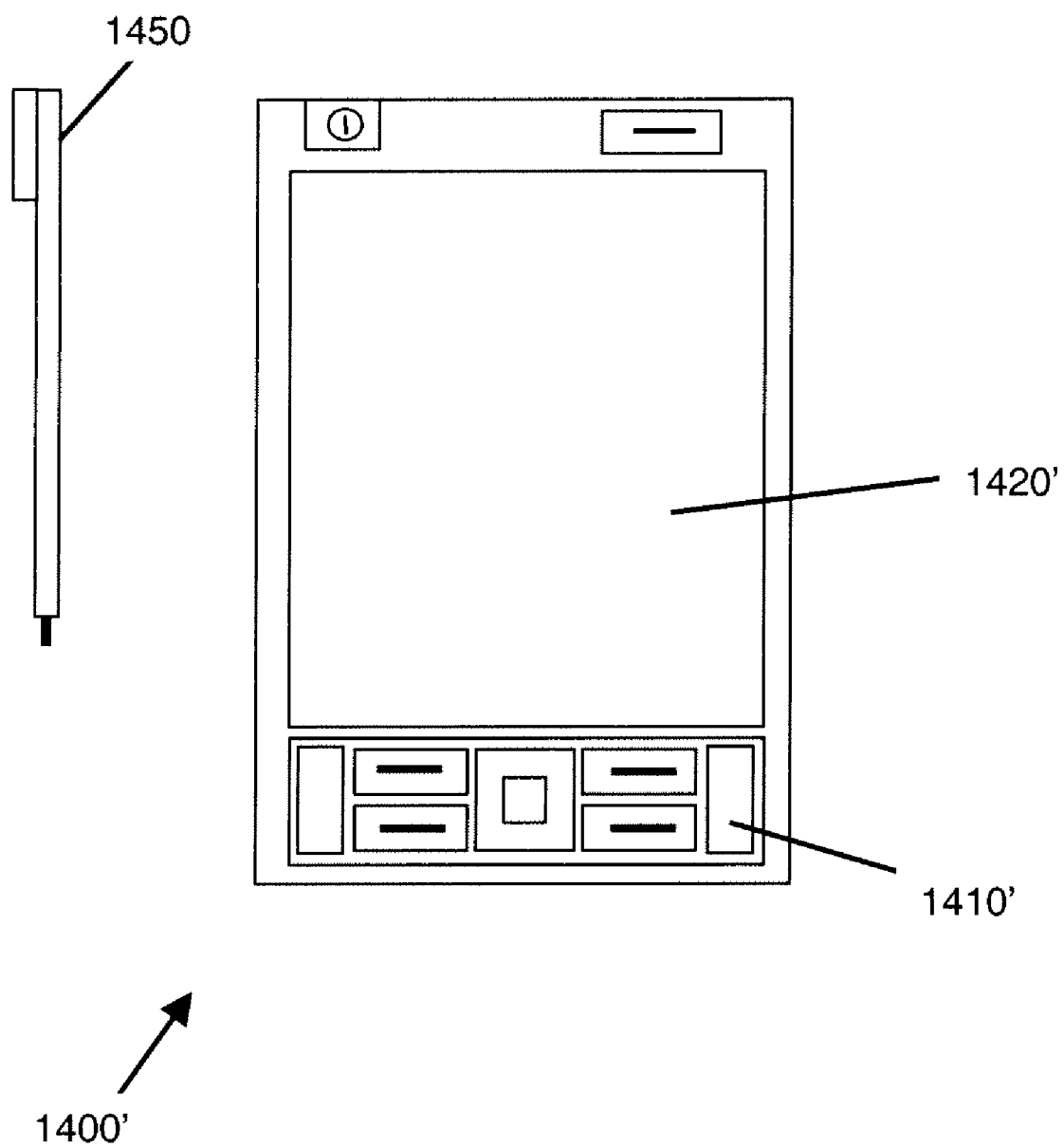
FIG. 15 shows another device incorporating features of an embodiment.
Figure 16:
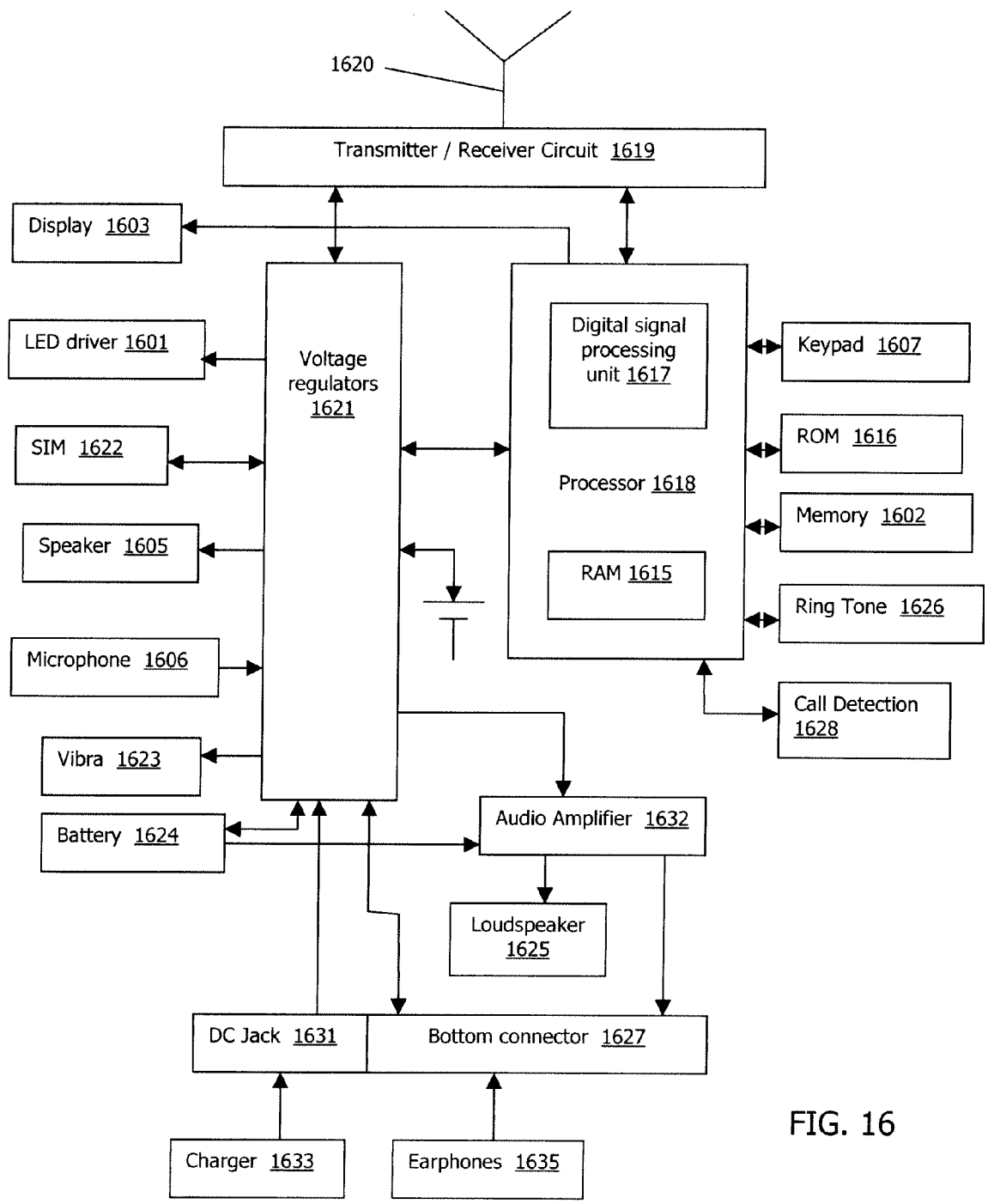
FIG. 16 is a block diagram illustrating the general architecture of an exemplary mobile device in which aspects of an embodiment may be employed.

In one embodiment, the device, may be for example, a PDA style device 1400' illustrated in FIG. 15. The PDA 1400' may have a keypad 1410', a touch screen display 1420' and a pointing device 1450 for use on the touch screen display 1420'. In still other alternate embodiments, the device may be a personal communicator, a tablet computer, a laptop or desktop computer, a television or television set top box or any other suitable device capable of containing the display 1420 and supported electronics such as the processor 1618 and memory 1602.

FIG. 11 illustrates in block diagram form one embodiment of a general architecture of the mobile device 1400. The mobile communications device may have a processor 1618 connected to the display 1603 for processing user inputs and displaying information on the display 1603. The processor 1618 controls the operation of the device and can have an integrated digital signal processor 1617 and an integrated RAM 1615. The processor 1618 controls the communication with a cellular network via a transmitter/receiver circuit 1619 and an antenna 1620. A microphone 1606 is coupled to the processor 1618 via voltage regulators 1621 that transform the user's speech into analog signals. The analog signals formed are A/D converted in an A/D converter (not shown) before the speech is encoded in the DSP 1617 that is included in the processor 1618. The encoded speech signal is transferred to the processor 1618, which e.g. supports, for example, the GSM terminal software. The digital signal-processing unit 1617 speech-decodes the signal, which is transferred from the processor 1618 to the speaker 1605 via a D/A converter (not shown).

The voltage regulators 1621 form the interface for the speaker 1605, the microphone 1606, the LED drivers 1101 (for the LEDS backlighting the keypad 1607 and the display 1603), the SIM card 1622, battery 1624, the bottom connector 1627, the DC jack 1631 (for connecting to the charger 1633) and the audio amplifier 1632 that drives the (hands-free) loudspeaker 1625.

A processor 1618 can also include memory 1602 for storing any suitable information and/or applications associated with the mobile communications device 1400 such as phone book entries, calendar entries, etc.

The processor 1618 also forms the interface for peripheral units of the device, such as for example, a (Flash) ROM memory 1616, the graphical display 1603, the keypad 1607, a ringing tone selection unit 1626, an incoming call detection unit 1628, the speech recognition unit 310 and a motion detectors 320. These peripherals may be hardware or software implemented. In alternate embodiments, any suitable peripheral units for the device can be included.

The software in the RAM 1615 and/or in the flash ROM 1616 contains instructions for the processor 1618 to perform a plurality of different applications and functions such as, for example, those described herein.

Figure 17:
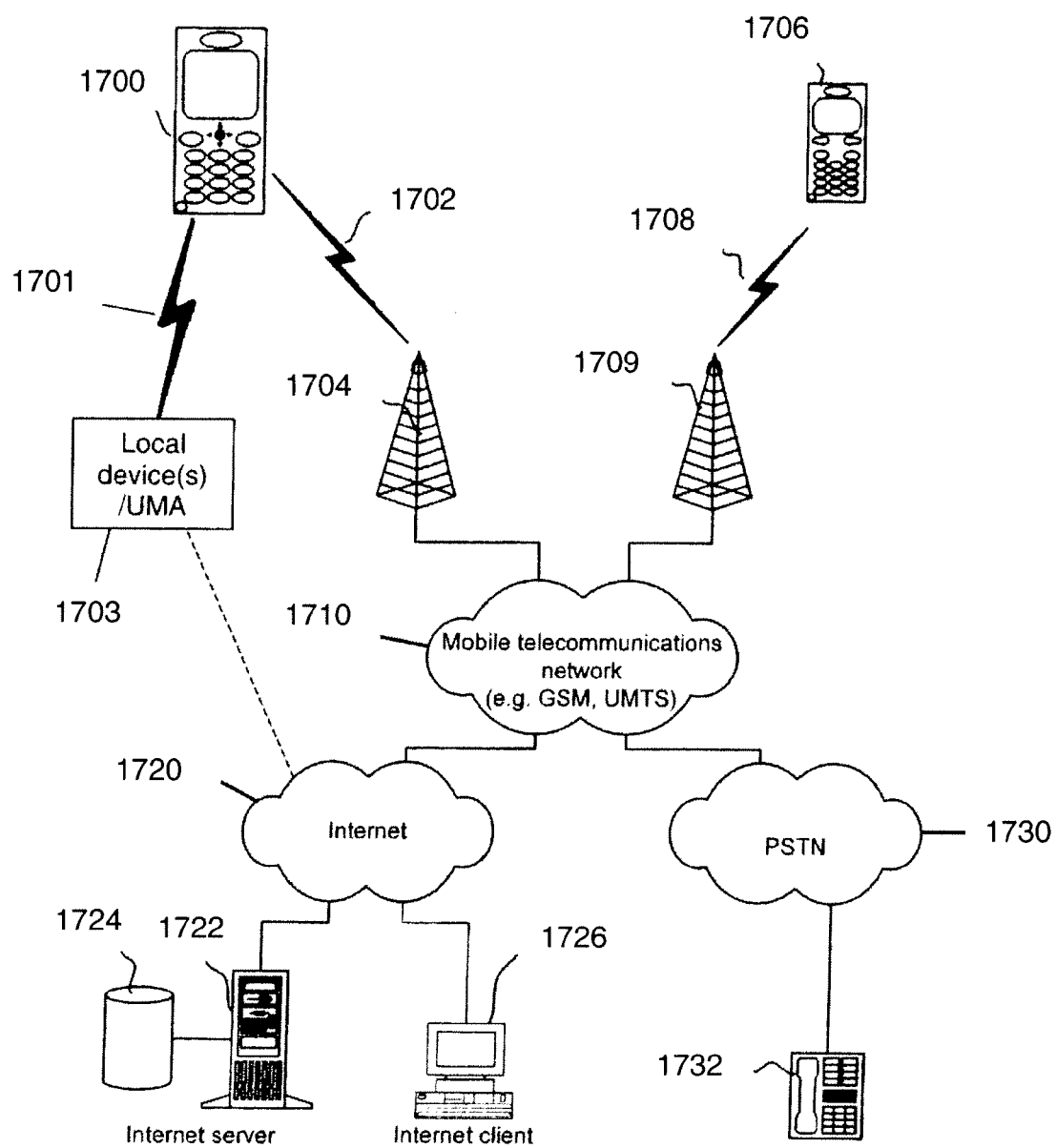
FIG. 17 is a schematic illustration of a cellular telecommunications system, as an example, of an environment in which a communications device incorporating features of an exemplary embodiment may be applied.

FIG. 17 is a schematic illustration of a cellular telecommunications system, as an example, of an environment in which a communications device 1700 incorporating features of an embodiment may be applied. Communication device 1700 may be substantially similar to that described above with respect to terminal 300. In the telecommunication system of FIG. 17, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 1700 and other devices, such as another mobile terminal 1706, a stationary telephone 1732, or an internet server 1722. It is to be noted that for different embodiments of the mobile terminal 1700 and in different situations, different ones of the telecommunications services referred to above may or may not be available. The aspects of the invention are not limited to any particular set of services in this respect.

The mobile terminals 1700, 1706 may be connected to a mobile telecommunications network 1710 through radio frequency (RF) links 1702, 1708 via base stations 1704, 1709. The mobile telecommunications network 1710 may be in compliance with any commercially available mobile telecommunications standard such as GSM, UMTS, D-AMPS, CDMA2000, FOMA and TD-SCDMA.

The mobile telecommunications network 1710 may be operatively connected to a wide area network 1720, which may be the internet or a part thereof. An internet server 1722 has data storage 1724 and is connected to the wide area network 1720, as is an internet client computer 1726. The server 1722 may host a www/hap server capable of serving www/hap content to the mobile terminal 1700.

For example, a public switched telephone network (PSTN) 1730 may be connected to the mobile telecommunications network 1710 in a familiar manner. Various telephone terminals, including the stationary telephone 1732, may be connected to the PSTN 1730.

The mobile terminal 1700 is also capable of communicating locally via a local link 1701 to one or more local devices 1703. The local link 1701 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 1703 can, for example, be various sensors that can communicate measurement values to the mobile terminal 1700 over the local link 1701. The above examples are not intended to be limiting, and any suitable type of link may be utilized. The local devices 1703 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 1700 may thus have multi-radio capability for connecting wirelessly using mobile communications network 1710, WLAN or both. Communication with the mobile telecommunications network 1710 may also be implemented using WiFi, WiMax, or any other suitable protocols, and such communication may utilize unlicensed portions of the radio spectrum (e.g. unlicensed mobile access (UMA)).

Figure 18:
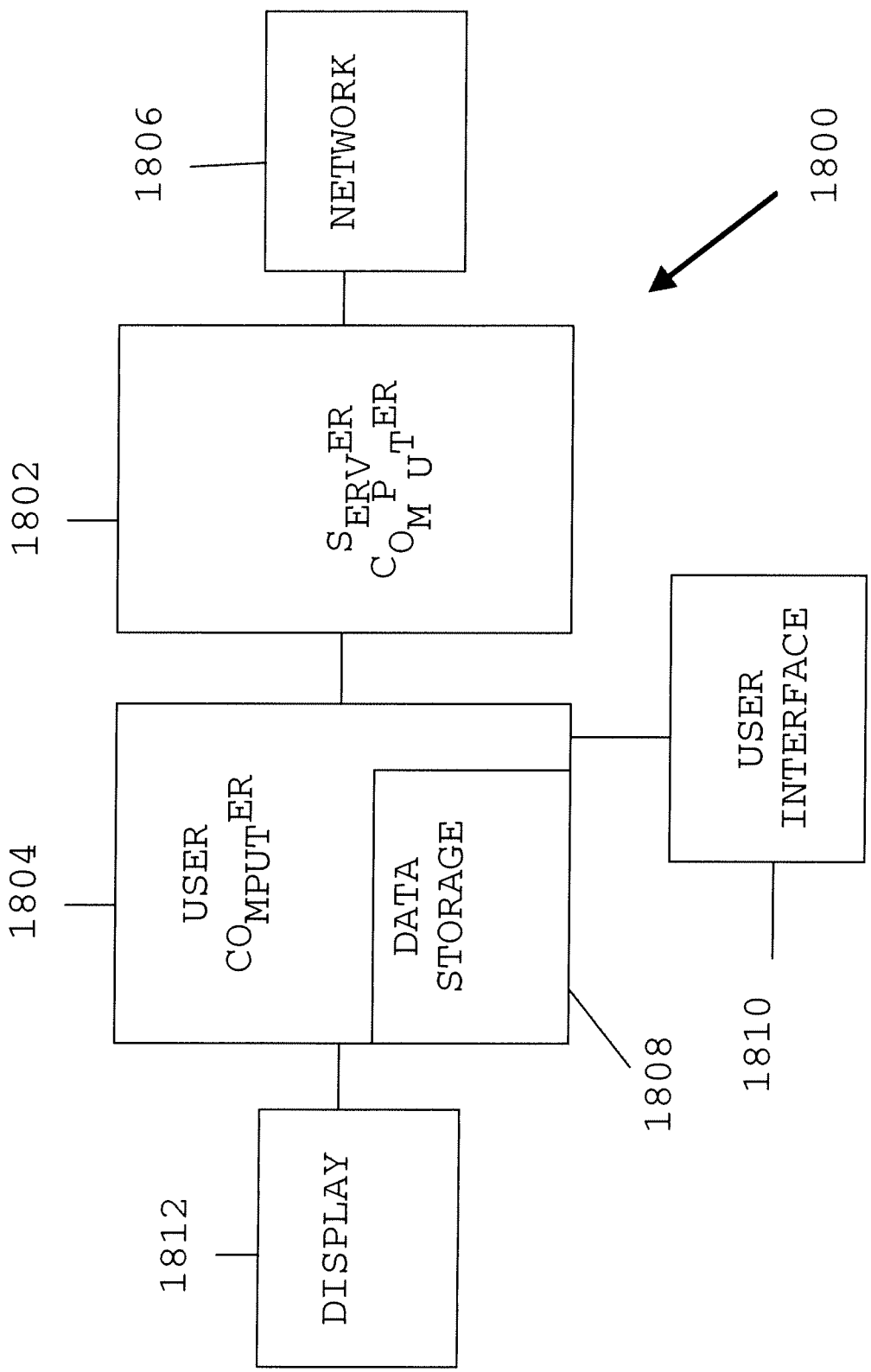
FIG. 18 illustrates a block diagram of an example of an apparatus incorporating features that may be used to practice aspects of the disclosed embodiments.

The disclosed embodiments may also include software and computer programs incorporating the process steps and instructions described herein that are executed in different computers. FIG. 18 is a block diagram of one embodiment of a typical apparatus 1800 incorporating features that may be used to practice aspects of the embodiments. As shown, a computer system 1802 may be linked to another computer system 1804, such that the computers 1802 and 1804 are capable of sending information to each other and receiving information from each other. In one embodiment, computer system 1802 could include a server computer adapted to communicate with a network 1806. Computer systems 1802 and 1804 can be linked together in any conventional manner including, for example, a modem, hard wire connection, or fiber optic link. Generally, information can be made available to both computer systems 1802 and 1804 using a communication protocol typically sent over a communication channel or through a dial-up connection on ISDN line. Computers 1802 and 1804 are generally adapted to utilize program storage devices embodying machine readable program source code which are adapted to cause the computers 1802 and 1804 to perform the method steps disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 1802 and 1804 may also include a microprocessor for executing stored programs. Computer 1802 may include a data storage device 1808 on its program storage device for the storage of information and data. The computer program or software incorporating the processes and method steps incorporating aspects of the invention may be stored in one or more computers 1802 and 1804 on an otherwise conventional program storage device. In one embodiment, computers 1802 and 1804 may include a user interface 1810, and a display interface 1812 from which aspects of the invention can be accessed. The user interface 1810 and the display interface 1812 can be adapted to allow the input of queries and commands to the system, as well as present the results of the commands and queries.

The disclosed embodiments may allow a user of the device to have some form of entertainment during by causing, for example, comical effects to be displayed on the recipients devices. The disclosed embodiments may also allow users to personalize video calls/casts.

In accordance with the disclosed embodiments the communication device may allow a user to initiate a video call, video conference or video cast to one or more other devices over a network. The device may be configured recognize or acknowledge an event that indicates that a visual effect is to be added to or imposed upon the video feed of the call. Upon acknowledging the event the effect, such as a visual effect, may be added to the video feed. The effect may be transferred to the receiving device where it is presented on the display of the receiving device over the video feed or the effect may be imposed over the video feed by the receiving device.

The effects that are added to the video feed and presented to the recipients of the video may correspond to an aspect of the video call, such as for example, the content of a call at any given time (i.e. context sensitive), the participant's attitude or state of mind at any time during the call and the like. The disclosed embodiments may supplement the video and audio feed of the call to accurately convey what the speaker is saying, for example, as it would be conveyed if the participants were having a face to face conversation. The disclosed embodiments may provide a substitute for non-verbal communications that are present but may not otherwise be visible during the video call. The presentation of the effects may also help one to understand the meaning of the conversation if the video and/or audio quality of the call are poor. It is also noted that the embodiments described herein may be employed individually or in any combination with each other.

It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An apparatus comprising:
    a processor; and
    a memory including computer program code, the memory and the computer program code configured to, with the processor, cause the apparatus to perform at least the following:
    recognize at least one of a motion, gesture, keyboard emoticon input, touch-drawing input, emoticon selection input or spoken word provided via an input unit as user input provided by a user of a first communication device during a video call, video conference or video cast between the first communication device and one or more second communication devices;

embed at least one corresponding effect, in response to the user input, into a video feed associated with the video call, video conference or video cast; and enable transmission of the video feed with the embedded effect from the first communication device to the one or more second communication devices.

2. The apparatus of claim 1, wherein the at least one effect includes at least one of a photograph, text, graphic, image, animation, cartoon, logo or sound.

3. The apparatus of claim 1, wherein the user input is provided via an input unit including at least one of a keyboard, motion detector, touch-enabled screen or speech recognition unit.

4. The apparatus of claim 3, wherein the apparatus is caused to recognize text input by a user of the apparatus as the keyboard emoticon input and embed a corresponding emoticon effect into the video feed.

5. The apparatus of claim 1, wherein the apparatus is or forms part of the first communication device, wherein the first communication device is a mobile communication device, a phone, a PDA, a personal communicator, a tablet computer, a laptop, a computer, a desktop computer, a television or a television set top box.

6. The apparatus of claim 1, wherein the apparatus is further configured to receive the video feed,
wherein
the user input is provided at a particular time during reception of the video feed; and
the effect is embedded such that the timing of the embedded effect in the video feed corresponds to the particular time.

7. The apparatus of claim 1, wherein the motion or gesture of the user comprises one or more of a non-verbal gesture, a facial expression, a body movement, a smile, a frown, a shoulder shrug, or a winking gesture.

8. A method comprising:
recognizing at least one of a motion, gesture, keyboard emoticon input, touch-drawing input, emoticon selection input or spoken word provided via an input unit as user input provided by a user of a first communication device during a video call, video conference or video cast between the first communication device and one or more second communication devices;
embedding at least one corresponding effect, in response to the user input, into a video feed associated with the video call, video conference or video cast;
enabling transmission of the video feed with the embedded effect from the first communication device to the one or more second communication devices.

9. The method of claim 8, wherein the at least one effect includes at least one of a photograph, text, graphic, image, animation, cartoon, logo or sound.

10. The method of claim 8, wherein the user input includes text entered by a user of the first communication device.

11. The method of claim 8, wherein the method comprises:
receiving the video feed in at least a second apparatus so that the at least one effect is presented to a user of the at least second apparatus in the received video feed.

12. The method of claim 11, wherein the at least one effect is presented in the at least second apparatus so as not to obstruct a face of a participant in the video call, conference or cast.

13. The method of claim 11, wherein the at least one effect is presented in the at least second apparatus so that the at least one effect is presented in a predefined location.

14. The method of claim 11, wherein the at least one effect is presented in the at least second apparatus so that the at least one effect is presented in random places on a display of the at least second apparatus.

15. The method of claim 8, further comprising selecting the at least one effect from a set of effects so that the at least one effect corresponds to the user input.

16. The method of claim 8, further comprising selecting the at least one effect from a set of effects so that the at least one effect is randomly chosen from the set.

17. The method of claim 8, wherein the at least one effect includes characters or symbols representing, emoticons input into the first apparatus by a user of the first apparatus.

18. The method of claim 8, wherein the at least one effect is a misrepresentation of the user input.

19. The method of claim 8, wherein at least one of the apparatus is a mobile communication device, a phone, a PDA, a personal communicator, a tablet computer, a laptop, a computer, a desktop computer, a television or a television set top box.

20. The method of claim 11, wherein the at least one effect is presented in the at least second apparatus so that the at least one effect follows a movement of a feature presented in the video feed.

21. A computer program product comprising:
a computer useable medium having computer readable code embodied therein, the computer readable code being configured to, upon execution, cause an apparatus to at least:
recognize at least one of a motion, gesture, keyboard emoticon input, touch-drawing input, emoticon selection input or spoken word provided via an input unit as user input provided by a user of a first communication device during a video call, video conference or video cast between the first communication device and one or more second communication devices;
embed at least one corresponding effect, in response to the user input, into a video feed associated with the video call, video conference or video cast;
enable transmission of the video feed with the embedded effect from the first communication device to the one or more second communication devices.

22. The computer program product of claim 21, wherein the at least one effect includes at least one of a photograph, text, graphic, image, animation, cartoon, logo or sound.

23. The computer program product of claim 21, wherein the user input includes text entered by a user of the first communication device the text corresponding to emoticon input to be embedded as the effect.

24. The computer program product of claim 21, wherein the computer readable program code is further configured to, upon execution, cause a second apparatus to receive the video feed so that the at least one effect is presented to a user of the at least second apparatus in the received video feed.

* * * * *

(12) EX PARTE REEXAMINATION CERTIFICATE (10101st)

United States Patent
Reponen et al.

(10) Number: US 8,373,799 C1
(45) Certificate Issued: Apr. 8, 2014

(54) VISUAL EFFECTS FOR VIDEO CALLS

(75) Inventors: Erika Reponen, Tampere (FI); Jarmo Kauko, Tampere (FI)

(73) Assignee: Nokia Corporation, Espoo (FI)

Reexamination Request:
No. 90/012,943, Aug. 7, 2013

Reexamination Certificate for:
Patent No.: 8,373,799
Issued: Feb. 12, 2013
Appl. No.: 11/617,940
Filed: Dec. 29, 2006

(51) Int. Cl.
*H04N 7/08* (2006.01)
*H04N 7/14* (2006.01)

(52) U.S. Cl.
USPC ........ 348/473; 348/14.08; 348/460; 348/461; 348/468; 348/578

(58) Field of Classification Search
None
See application file for complete search history.

(56) References Cited

To view the complete listing of prior art documents cited during the proceeding for Reexamination Control Number 90/012,943, please refer to the USPTO's public Patent Application Information Retrieval (PAIR) system under the Display References tab.

*Primary Examiner* — William H Wood

(57) ABSTRACT

An apparatus including a display, an input unit and a processor connected to the display and input unit, the processor being configured to recognize an input and embed at least one effect, in response to the input, into a video feed transmitted from the apparatus.

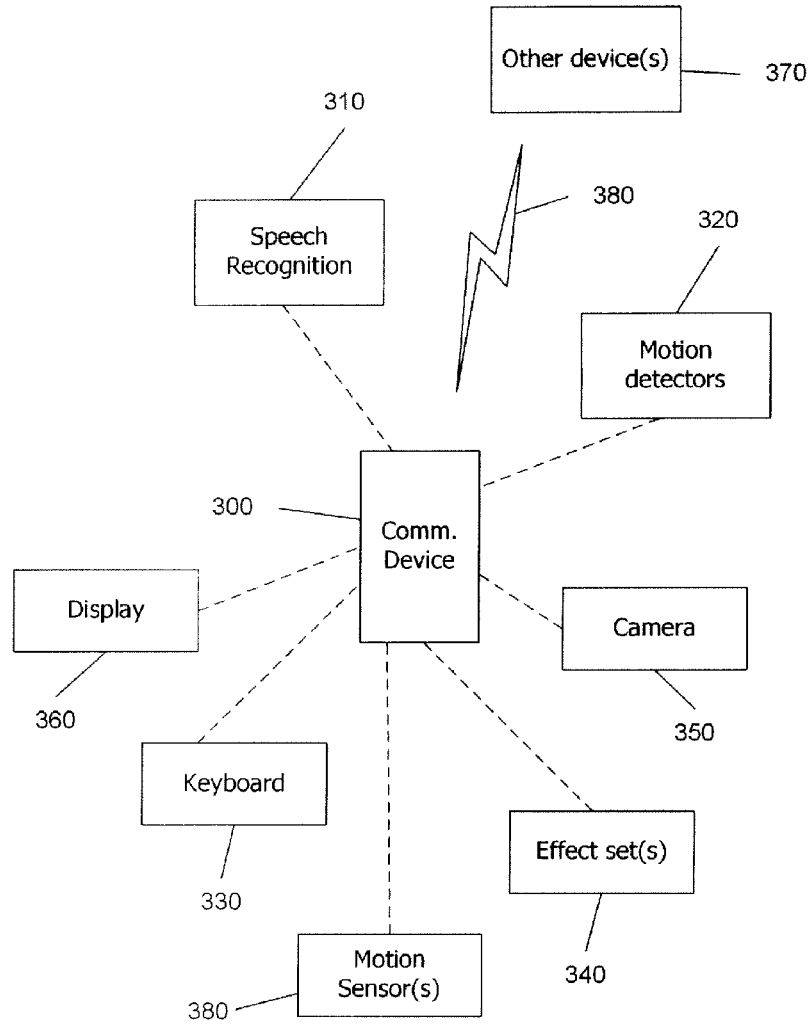

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 4, 7, 10 and 23 are cancelled.

Claims 1, 8 and 21 are determined to be patentable as amended.

Claims 2, 5-6, 9, 11-20, 22 and 24, dependent on an amended claim, are determined to be patentable.

New claims 25-30 are added and determined to be patentable.

1. An apparatus comprising:
a processor; and
a memory including computer program code,
the memory and the computer program code configured to, with the processor, cause the apparatus to perform at least the following:
recognize [at least one of] a motion[, gesture, keyboard emoticon input, touch-drawing input, emoticon selection input or spoken word] *of a first communication device* provided via [an input unit] *a motion detector* as user input provided by a user of [a] *the* first communication device during a video call, video conference or video cast between the first communication device and one or more second communication devices;
embed at least one corresponding effect, in response to the user input, into a video feed associated with the video call, video conference or video cast; and
enable transmission of the video feed with the embedded effect from the first communication device to the one or more second communication devices.

8. A method comprising:
recognizing [at least one of] a motion[, gesture, keyboard emoticon input, touch-drawing input, emoticon selection input or spoken word] *of a first communication device* provided via [an input unit] *a motion detector* as user input provided by a user of [a] *the* first communication device during a video call, video conference or video cast between the first communication device and one or more second communication devices;
embedding at least one corresponding effect, in response to the user input, into a video feed associated with the video call, video conference or video cast;
enabling transmission of the video feed with the embedded effect from the first communication device to the one or more second communication devices.

21. A computer program product comprising:
a computer useable medium having computer readable code embodied therein, the computer readable code being configured to, upon execution, cause an apparatus to at least:
recognize [at least one of] a motion[, gesture, keyboard emoticon input, touch-drawing input, emoticon selection input or spoken word] *of a first communication device* provided via [an input unit] *a motion detector* as user input provided by a user of [a] *the* first communication device during a video call, video conference or video cast between the first communication device and one or more second communication devices;
embed at least one corresponding effect, in response to the user input, into a video feed associated with the video call, video conference or video cast;
enable transmission of the video feed with the embedded effect from the first communication device to the one or more second communication devices.

*25. The apparatus of claim 1, wherein the apparatus is further configured to receive the effect drawn by a user of the first communication device upon an image of a participant in the video call, video conference or video cast, wherein the apparatus is configured to embed the at least one corresponding effect by embedding the effect drawn by the user such that the effect follows the image of the participant during at least a portion of the video call, video conference or video cast.*

*26. The apparatus of claim 1, wherein the effect comprises a characteristic of an avatar or a virtual pet that is embedded into the video feed.*

*27. The method of claim 8, further comprising receiving the effect drawn by a user of the first communication device upon an image of a participant in the video call, video conference or video cast, wherein embedding the at least one corresponding effect comprises embedding the effect drawn by the user such that the effect follows the image of the participant during at least a portion of the video call, video conference or video cast.*

*28. The method of claim 8, wherein the effect comprises a characteristic of an avatar or a virtual pet that is embedded into the video feed.*

*29. The computer program product of claim 21, wherein the apparatus is further caused to receive the effect drawn by a user of the first communication device upon an image of a participant in the video call, video conference or video cast, wherein the apparatus is caused to embed the at least one corresponding effect by embedding the effect drawn by the user such that the effect follows the image of the participant during at least a portion of the video call, video conference or video cast.*

*30. The computer program product of claim 21, wherein the effect comprises a characteristic of an avatar or a virtual pet that is embedded into the video feed.*

\* \* \* \* \*